United States Patent
Wu et al.

(10) Patent No.: US 7,197,163 B2
(45) Date of Patent: Mar. 27, 2007

(54) WATERMARK EMBEDDING METHOD BASED ON DCT SUBBAND IMAGE CHARACTERS

(75) Inventors: Guo-Zua Wu, Hsinchu (TW); Yi-Jung Wang, Hsinchu (TW); Zu-Wen Chao, Hsinchu (TW); Chwan-Chang Chen, Hsinchu (TW)

(73) Assignee: Industrial Technology Research Institute, Chu-Tung (TW)

( * ) Notice: Subject to any disclaimer, the term of this patent is extended or adjusted under 35 U.S.C. 154(b) by 727 days.

(21) Appl. No.: 10/700,549

(22) Filed: Nov. 5, 2003

(65) Prior Publication Data
US 2005/0018872 A1 Jan. 27, 2005

(30) Foreign Application Priority Data
Jul. 22, 2003 (TW) .............................. 92119969 A

(51) Int. Cl.
*G06K 9/00* (2006.01)
(52) U.S. Cl. ...................................... 382/100; 382/250
(58) Field of Classification Search ................ 382/100, 382/232, 250, 240; 713/179; 358/3.28; 348/461; 370/522; 380/51
See application file for complete search history.

(56) References Cited

U.S. PATENT DOCUMENTS 6,285,775 B1 * 9/2001 Wu et al. ................... 382/100

OTHER PUBLICATIONS

Iamge Refining Technique using Digital Watermarking, Chuan-Fu Wu and Wen-Shyong Hsieh, Taiwan,Oct. 6, 1999,IEEE 2000.*
Robust Image Watermarking Based on Hybrid Transformation, der-Chyuan Lou and Chia-Hung Sung, Taiwan, IEEE 2003.*
DCT-Domain Watermarking Technique for still Images: Detector Performance Analysis and a New Structure, Juan R.Hernandez,IEEE 2000.*

* cited by examiner

Primary Examiner—Joseph Mancuso
Assistant Examiner—Nancy Bitar
(74) Attorney, Agent, or Firm—Birch, Stewart, Kolasch & Birch, LLP

(57) ABSTRACT

A watermark embedding method based on DCT subband image characters is disclosed. An original image is converted into a frequency image using a discrete cosine transformation. The watermark information is then embedded into a specific embedding block in each macro-block of the frequency image. The method has the following advantages: (1) the image embedded by watermark is resistant from distortion and damages from compressions; (2) the watermark image can be extracted without employing the original image; and (3) the quality of the image embedded with the watermark image can remain intact.

15 Claims, 3 Drawing Sheets

WATERMARK EMBEDDING METHOD BASED ON DCT SUBBAND IMAGE CHARACTERS

This Nonprovisional application claims priority under 35 U.S.C. § 119(a) on Patent Application No(s). 092119969 filed in TAIWAN on Jul. 22, 2003, the entire contents of which are hereby incorporated by reference.

BACKGROUND OF THE INVENTION

1. Field of Invention

The invention relates to an information embedding method and, in particular, to a method that embeds a binary watermark image into the subband image of an original image.

2. Related Art

It is a trend to digitize information nowdays. However, due to the ease of distributing and copying digital images, the protection is therefore not as easy as convention ones. The copyright of digital data thus receives much attention. To ensure the security of digital image data transmissions and to avoid malicious eavesdropping, a widely used method is the "watermark embedding technique". The "watermark embedding technique" is to embed in an orignal digital image to be transmitted some watermark information that is unrelated to the original digital image data. Unauthorized third parties are thus unable to take and use the digital image data. Therefore, currently most digital image data use this way to prevent eavesdroppers from stealing and damaging the original digital image data.

From the appearance of the watermark printed digital image, one can simply categorize the watermark information as visible and invisible. From the operational processing, one can divide the watermark information into space domain and frequency domain. However, a good watermark embedding technique has to satisfy the following three basic properties in order to achieve the goal of protecting the original digital image data. First, it should be uneasy to detect. That is, the embedded watermark information should not be easy to be discovered by normal image processing methods. Alternatively, one can try to embed the watermark information in such a way that only a tiny change is made to the image and human eyes cannot detect the difference. Secondly, it has to be robust. The embedded watermark information should be able to resistant to various kinds of attacks, including image processing, magnification, shrinking, rotation, compression and modification. Thirdly, it does not require the original digital image data. When detecting or recovering the watermark information, one should not need another copy of the original digital image data in order to process.

Therefore, it is an important trend and direction for people in the field of watermark embedding detection technology to develop an effective and robust watermark embedding technique for all kinds of digital image data so that users can rapidly and easily detect the watermark information and recovering the original digital image.

SUMMARY OF THE INVENTION

In view of the foregoing, the disclosed watermark embedding method for digital image data is one that is able to perform subband image processing in the frequency domain.

The watermark embedding method based on the DCT subband image character according to the invention contains the following steps. First, a first experience parameter TH1 and a second experience parameter TH2 are determined. The first parameter TH1 can be set by the required image distortion. The second parameter TH2 performs its setting according to thr required image robustness. Afterwards, the frequency image converted from the original image and the binary watermark image series (A1, . . . An) are obtained. The system then extracts the macro-block of the frequency macro-block and reads the binary watermark image data An according to their order. Afterwards, the system performs comparison the parameter combination and their associated errors in the embedded block of the macro-block. The parameter combination with the smallest errors are added and substracted by TH2 (determined by the numerical type) to replace the discrete cosine parameters in the subband of the embedded block. Such parameter setting is performed in each macro-block of the frequency image until the watermark information is completely embedded in the image.

With the disclosed method, it is possible to embed and hide the watermark information in the embedded blocks of specific macro-blocks of the frequency image converted from the original image. This cannot only keep the original image intact, but is also able to withstand strong damages. Moreover, the watermark image can be directly extracted without the aid of the original image. Therefore, it is a simple but robust "watermark embedding technique."

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The specification mainly proposes a watermark embedding method based on the discrete cosine transformation (DCT) characters. The original image 900 is first converted into a frequency image 910 using the DCT. The binary watermark image (a digital image that can be represented by 0 and 1) is then embedded into specific subband image of particular blocks.

Figure 1:
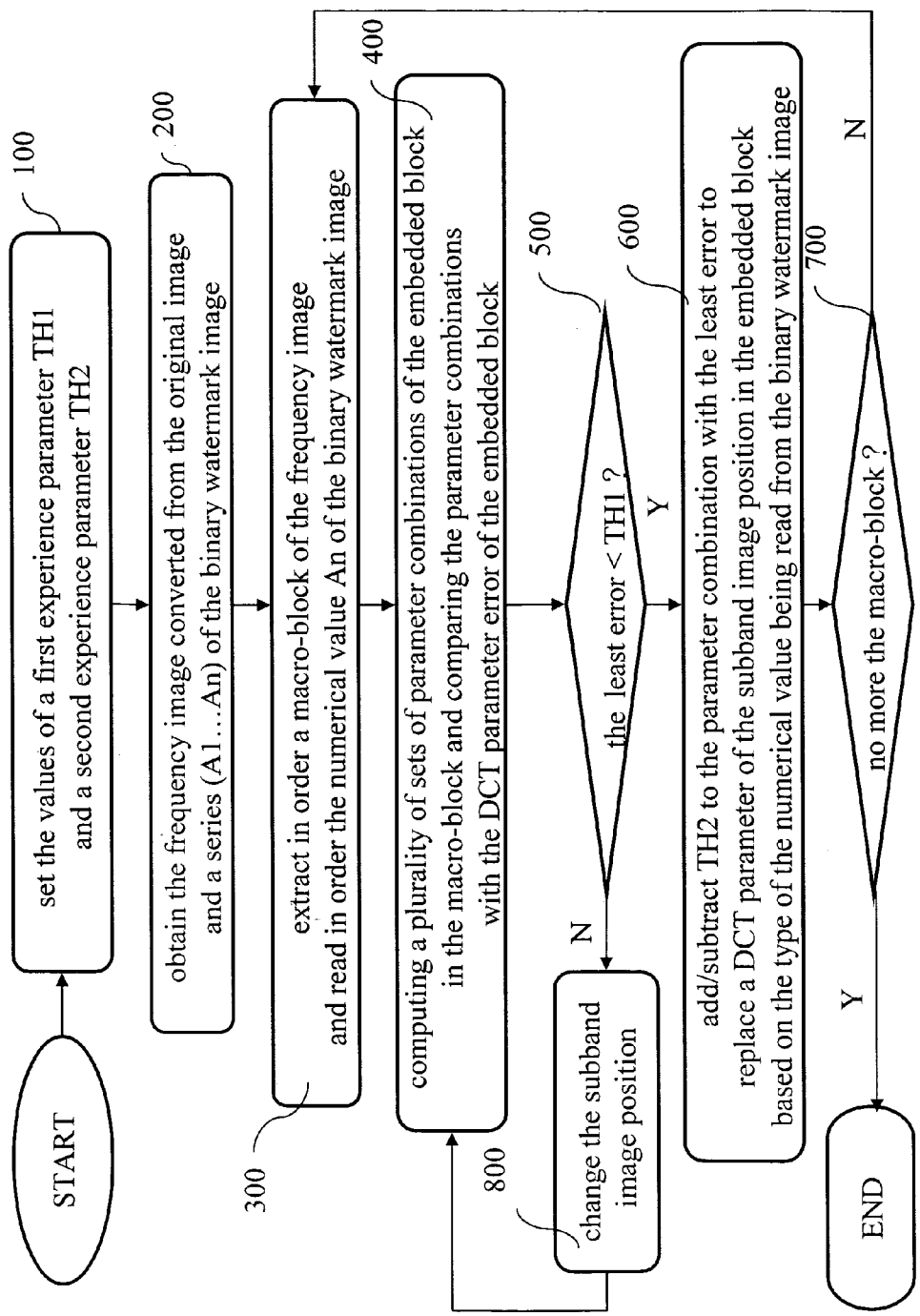
FIG. 1 is a flowchart of the disclosed watermark embedding method based on the DCT subband image characters.

Please refer to FIG. 1 for the procedure of the disclosed method. First, a first experience parameter TH1 and a second experience parameter TH2 (step 100) are determined. Afterwards, the system obtains the frequency image 910 converted from the orignal image 900 and the binary watermark image series (A1, . . . An) (step 200). Each of the macro-blocks in the frequency image 910 and the numerical value of the binary watermark image An are extracted. There are many methods available for macro-block extraction. A preferred embodiment is to extract from left to right (moving to the right by two blocks at a time) and then from top to down (moving down by two blocks at a time). Various parameter combinations and the least error associated with the DCT in the specific subband image of particular embedded blocks are calculated (step 400). If the least error is smaller than TH1 (step 500) and the numerical value An is 1 (or 0), the parameter combination with the least error is added by TH2 to replace the DCT parameter of the subband image in the embedded block (step 600). On the other hand, if the numerical value An is 0 (or 1), the parameter combination with the least error is subtracted by TH2 to replace the DCT parameter of the subband image in the embedded block.

Up to this point, the embedding procedure for a macro-block watermark image is completed. The system continues to check whether there is any other undefined macro-block (step 700). If the answer is yes, then the procedure goes back to step 300; otherwise, the procedure terminates.

However, if the least error is greater than TH1, it means that the current specific subband image is not suitable for inserting information. One then has to perform the step of switching the position of the specific subband image (step 800), after which the procedure restarts from step 400. The switching step continues until the most appropriate specific subband image location is found.

For the computation methods of various parameter combinations, we propose seven estimation functions as embodiment of the invention. However, these do not exhaust all cases and other functions are possible. These seven functions are:

$$[\text{Block}(1,1)_{D(a,b)}+\text{Block}(1,2)_{D(a,b)}+\text{Block}(1,3)_{D(a,b)}+\text{Block}(2,1)_{D(a,b)}+\text{Block}(2,3)_{D(a,b)}+\text{Block}(3,1)_{D(a,b)}+\text{Block}(3,2)_{D(a,b)}+\text{Block}(3,3)_{D(a,b)}]/8; \quad (1)$$

$$[\text{Block}(1,1)_{D(a,b)}+\text{Block}(3,3)_{D(a,b)}]/2; \quad (2)$$

$$[\text{Block}(1,2)_{D(a,b)}+\text{Block}(3,2)_{D(a,b)}]/2; \quad (3)$$

$$[\text{Block}(2,1)_{D(a,b)}+\text{Block}(2,3)_{D(a,b)}]/2; \quad (4)$$

$$[\text{Block}(1,3)_{D(a,b)}+\text{Block}(3,1)_{D(a,b)}]/2; \quad (5)$$

$$[(\text{Block}(1,1)_{D(a,b)}+\text{Block}(1,2)_{D(a,b)}+\text{Block}(1,3)_{D(a,b)})/3+(\text{Block}(3,1)_{D(a,b)}+\text{Block}(3,2)_{D(a,b)}+\text{Block}(3,3)_{D(a,b)})/3]/2; \text{ and} \quad (6)$$

$$[(\text{Block}(1,1)_{D(a,b)}+\text{Block}(2,1)_{D(a,b)}+\text{Block}(3,1)_{D(a,b)})/3+(\text{Block}(1,3)_{D(a,b)}+\text{Block}(2,3)_{D(a,b)}+\text{Block}(3,3)_{D(a,b)})/3]/2; \quad (7)$$

where Block(1,1), Block(1,2), Block(1,3), Block(2,1), Block(2,3), Block(3,1), Block(3,2), and Block(3,3) represent 3*3 macro-blocks from , and D(a,b) is the DCT parameter of the subband image located at the position (a,b).

As to the selection of the embedded block among each macro-block, it can be any one or the central block (the preferred one) in the macro-block. The selection of the specific subband image in each embedded block is usually done by choosing one with the lowest frequency. However, when the least error is found to be greater than TH1 in step 600, another subband image has to be selected to repeat steps 500 and 600. Reselecting the subband image is performed according to the high-frequency order (i.e. scanning in a zigzag way). Theoretically speaking, the frequency of the newly selected subband image is only lower than the previous subband image. This can avoid the problem of difficult extraction of the watermark image as a result of embedding it in a subband image with an extremely high frequency. Of course, the subband image selection can be performed in a predetermined way. We will use FIG. 3 to explain in further detail.

Figure 2:
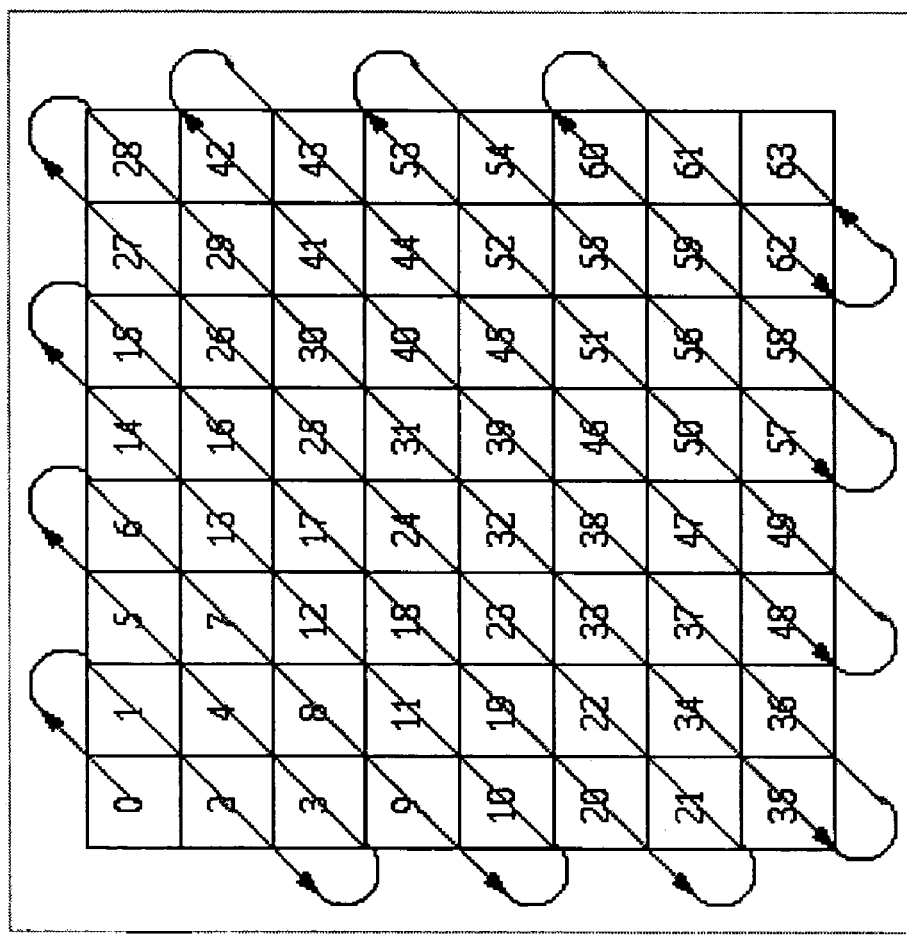
FIG. 2 is a schematic view of embedded block selection according to the disclosed method.

Please refer to FIG. 2 for the zigzag scanning scheme. This is a well-known method. Since this type of zigzag scanning can scan in the direction of increasing frequencies (as shown by the arrow from block 0 to block 63), it is very useful for searching the next-to-highest frequency subband image.

Figure 3:
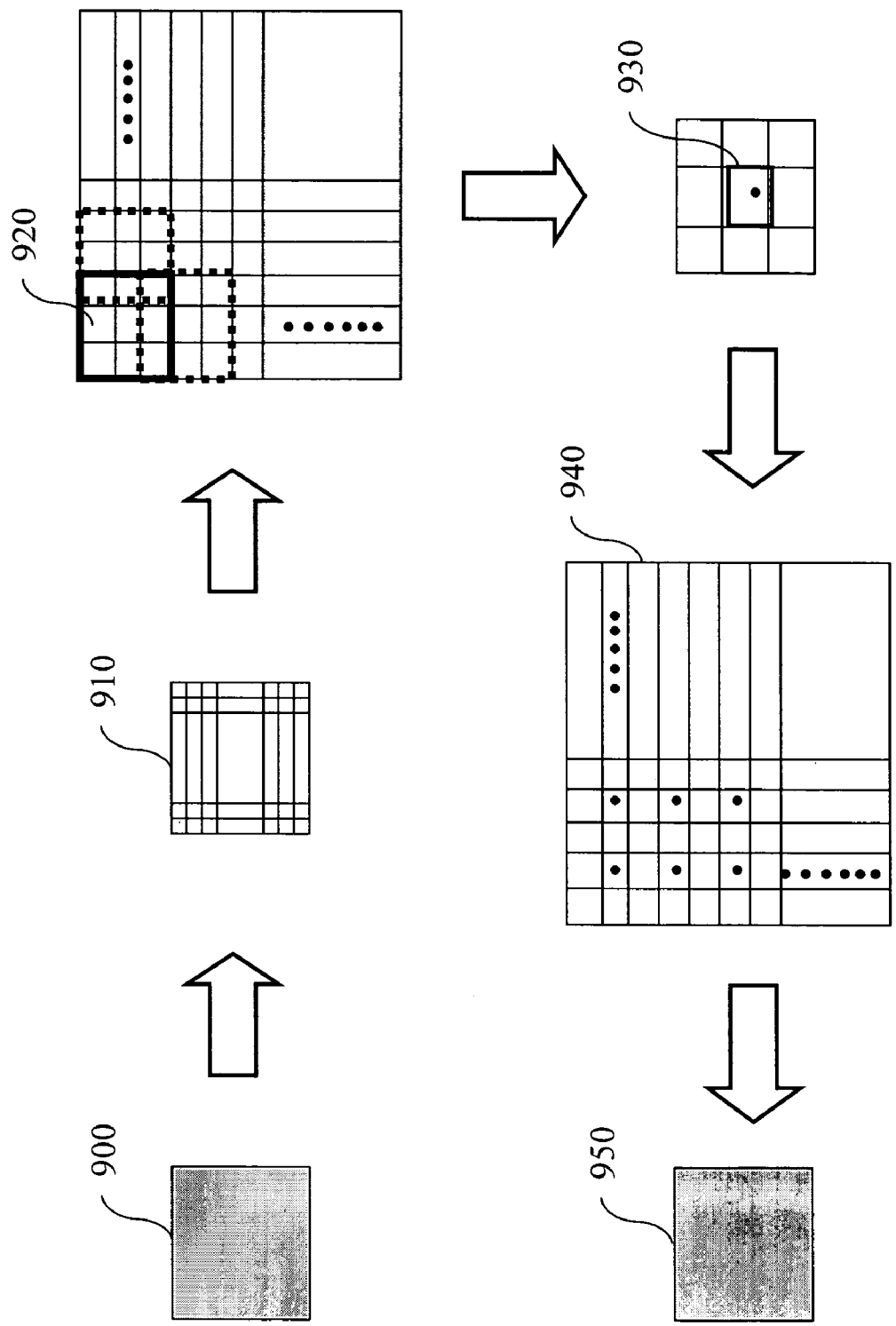
FIG. 3 is a schematic view of an embodiment of the invention showing how the watermark image is embedded.

Please refer to FIG. 3 for an embodiment of the invention. We first set the values of the first experience parameter TH1 and the second experience parameter TH2. The original image is then converted by the 8*8-block DCT into a frequency image 910.

We set 3*3 blocks as the range for extraction each macro-block. We then extract each of the 3*3 macro-blocks 920 and read the numerical values An of thye binary watermark image. Afterwards, we begin the embedding task for each of the 3*3 macro-blocks 920.

We assign the embedded block 930 as the central block Block(2,2) in each 3*3 macro-block 920 and use the DCT parameter of the embedded block position (3,2) (i.e. $D(3,2)$) as the embedding position. After determining the numerical value type that is being read, we follow different procedures to determine the steps that should be take to embed the watermark. When the task of embedding the specific subband images of the embedded blocks 930 in all the 3*3 macro-blocks 920 ($D(3,2)$ in the current embodiment) is done, a frequency image 940 with binary watermark information is produced. We then use an inverse DCT (IDCT) to convert the frequency image 940 into an embedded image 950.

In the current embodiment, the method also automatically changes to use $D(3,3)$ as the embedded position when the least error of the DCT parameter of all the parameter combinations and the embedded block 930 is greater than the first experience parameter TH1.

Certain variations would be apparent to those skilled in the art, which variations are considered within the spirit and scope of the claimed invention.

What is claimed is:

1. A watermark embedding method based on discrete cosine transformation (DCT) subband image characters to generate a frequency image from an original image using an 8*8-block DCT and to embed a binary watermark image into a subband image of the frequency image, the method comprising the steps of:

setting the values of a first experience parameter TH1 and a second experience parameter TH2;

obtaining the frequency image converted from the original image and a series (A1 . . . An) of the binary watermark image;

extracting in order a 3*3 macro-block of the frequency image and read in order the numerical value An of the binary watermark image; and analyzing the type of the numerical value being read from the binary watermark image and performing a DCT parameter setting for an embedded block, which further includes the steps of:

computing a plurality of sets of parameter combinations of the embedded block in the 3*3 macro-block and comparing the parameter combinations with the DCT parameter error of the embedded block;

adding the parameter combination with the least error and TH2 to replace a DCT parameter of the subband image position in the embedded block when the least error is less than TH1 and An is one of 1 or 0; and subtracting TH2 from the parameter combination with the least error to replace a DCT parameter of the subband image position in the embedded block when the least error is less than TH1 and An is the other of 1 or 0.

2. The method of claim 1, wherein the first experience parameter TH1 is set according to required image distortion.

3. The method of claim 1, wherein the second experience parameter TH2 is set according to required image robustness.

4. The method of claim 1, wherein the extraction of the 3*3 macro-block is performed from left to right (two blocks to the right at a time) and from top to bottom (two blocks down at a time).

5. The method of claim 1, wherein the embedded block is the central block Block(2,2) of the 3*3 macro-block.

6. The method of claim 1, wherein the estimation function of the parameter combinations is selected from the group consisting of:

$$[Block(1,1)_{D(a,b)}+Block(1,2)_{D(a,b)}+Block(1,3)_{D(a,b)}+Block(2,1)_{D(a,b)}+Block(2,3)_{D(a,b)}+Block(3,1)_{D(a,b)}+Block(3,2)_{D(a,b)}+Block(3,3)_{D(a,b)}]/8; \quad (1)$$

$$[Block(1,1)_{D(a,b)}+Block(3,3)_{D(a,b)}]/2; \quad (2)$$

$$[Block(1,2)_{D(a,b)}+Block(3,2)_{D(a,b)}]/2; \quad (3)$$

$$[Block(2,1)_{D(a,b)}+Block(2,3)_{D(a,b)}]/2; \quad (4)$$

$$[Block(1,3)_{D(a,b)}+Block(3,1)_{D(a,b)}]/2; \quad (5)$$

$$[(Block(1,1)_{D(a,b)}+Block(1,2)_{D(a,b)}+Block(1,3)_{D(a,b)})/3+(Block(3,1)_{D(a,b)}+Block(3,2)_{D(a,b)}+Block(3,3)_{D(a,b)})/3]/2; \text{ and} \quad (6)$$

$$[(Block(1,1)_{D(a,b)}+Block(2,1)_{D(a,b)}+Block(3,1)_{D(a,b)})/3+(Block(1,3)_{D(a,b)}+Block(2,3)_{D(a,b)}+Block(3,3)_{D(a,b)})/3]/2; \quad (7)$$

where Block(1,1), Block(1,2), Block(1,3), Block(2,1), Block(2,3), Block(3,1), Block(3,2), and Block(3,3) represent the 3*3 macro-blocks from left-top to right-bottom, and $_{D(a,b)}$ is the DCT parameter of the subband image located at the position (a,b).

7. The method of claim 6, wherein a=3 and b=2.

8. The method of claim 6, wherein the subband image position is changed to a=3 and b=3 if the least error of a=3 and b=2 is greater than the first experience parameter TH1.

9. The method of claim 1, wherein adjacent 3*3 macro-blocks allow overlap 1*3 blocks on top/bottom or 3*1 blocks on left/right.

10. A watermark embedding method based on DCT subband image characters to generate a frequency image from an original image using a p*p block DCT and to embed a binary watermark image in a subband image of the frequency image, the method comprising the steps of:

setting the values of a first experience parameter TH1 and a second experience parameter TH2;

obtaining the frequency image converted from the original image and a series (A1 . . . An) of the binary watermark image;

extracting in order a q*q macro-block of the frequency image and read in order the numerical value An of the binary watermark image; and analyzing the type of the numerical value being read and performing a DCT parameter setting for an embedded block, which further includes the steps of:

computing a plurality of sets of parameter combinations of the embedded block in the q*q macro-block and comparing the parameter combinations with the DCT parameter error of the embedded block;

adding the parameter combination with the least error and TH2 to replace a DCT parameter of the subband image position in the embedded block when the least error is less than TH1 and An is one of 1 or 0; and subtracting TH2 from the parameter combination with the least error to replace a DCT parameter of the subband image position in the embedded block when the least error is less than TH1 and An is the other of 1 or 0.

11. The method of claim 10, wherein the first experience parameter TH1 is set according to required image distortion.

12. The method of claim 10, wherein the second experience parameter TH2 is set according to required image robustness.

13. The method of claim 10, wherein the extraction of the q*q macro-block is performed from left to right (two blocks to the right at a time) and from top to bottom (two blocks down at a time).

14. The method of claim 10, wherein the embedded block is an arbitrary block Block(i,j) of the q*q macro-block.

15. The method of claim 10, wherein adjacent q*q macro-blocks allow overlap 1*q blocks on top/bottom or q*1 blocks on left/right.

* * * * *